April 3, 1934.   J. J. HANLEY   1,953,602
APPARATUS FOR MAINTAINING AN UNFAILING AND
UNINTERRUPTED SUPPLY OF ELECTRICAL ENERGY
Filed Nov. 7, 1932   3 Sheets-Sheet 3
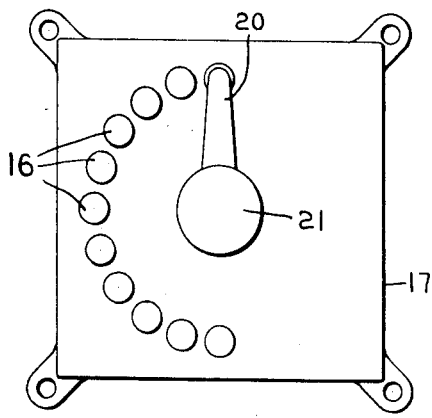
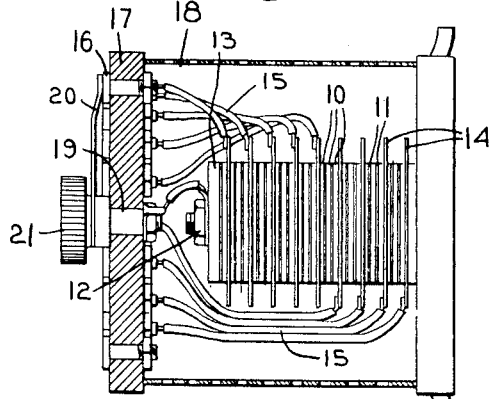
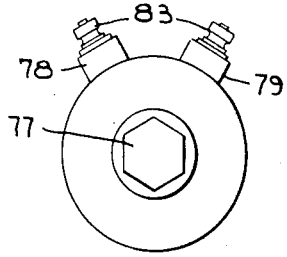
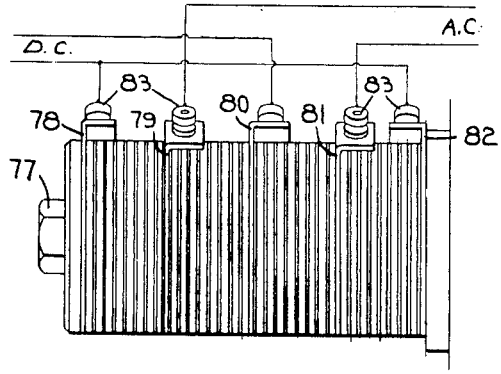
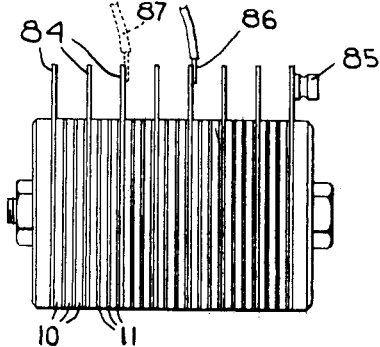
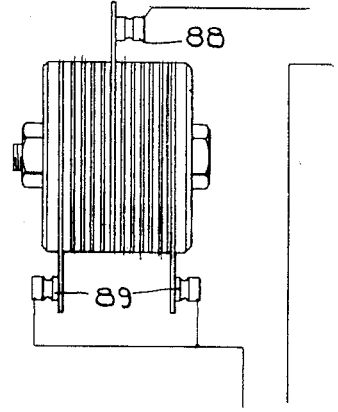
Inventor.
John J. Hanley
by Heard Smith & Tennant,
Attys Patented Apr. 3, 1934

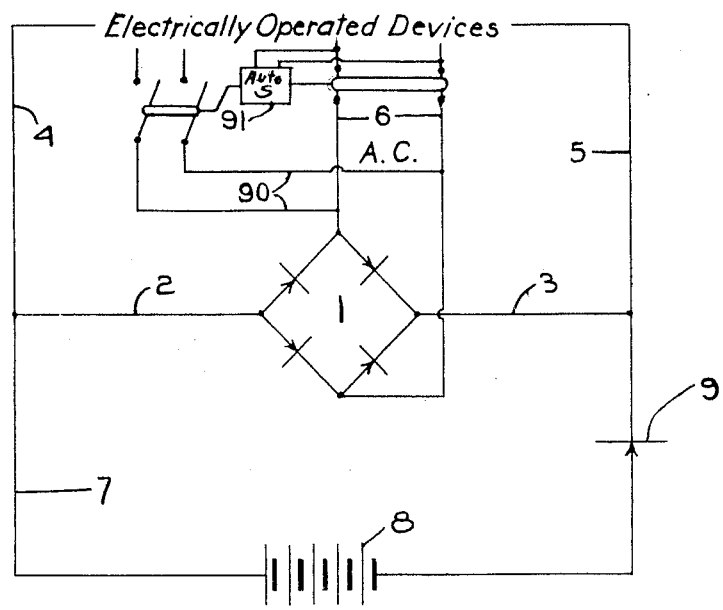
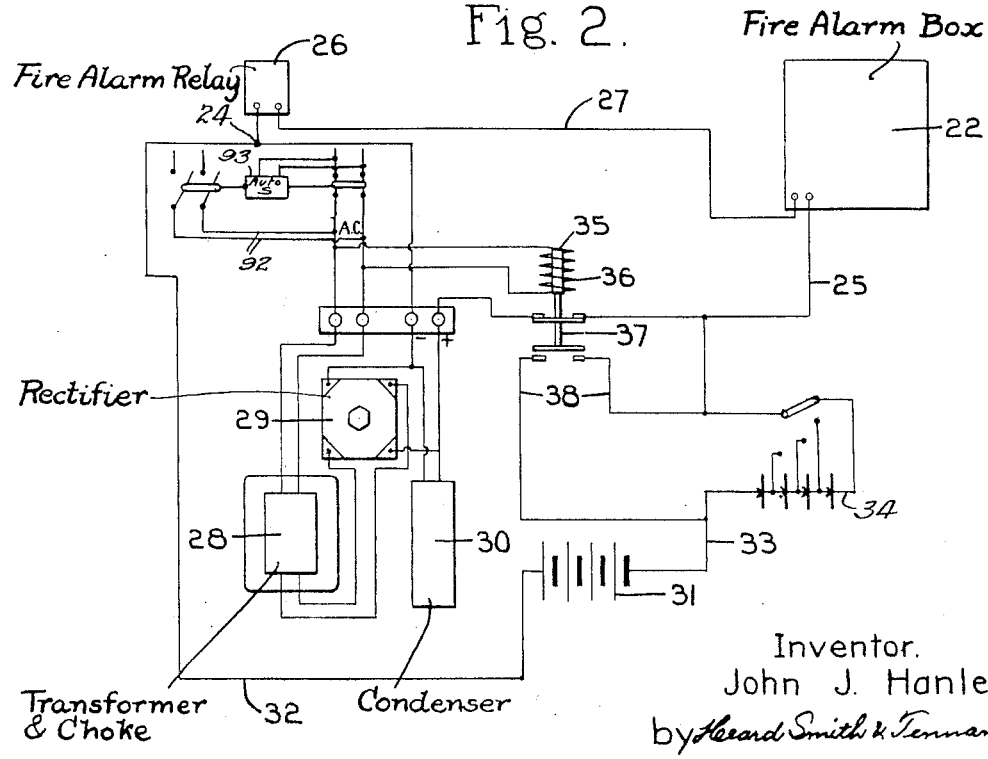

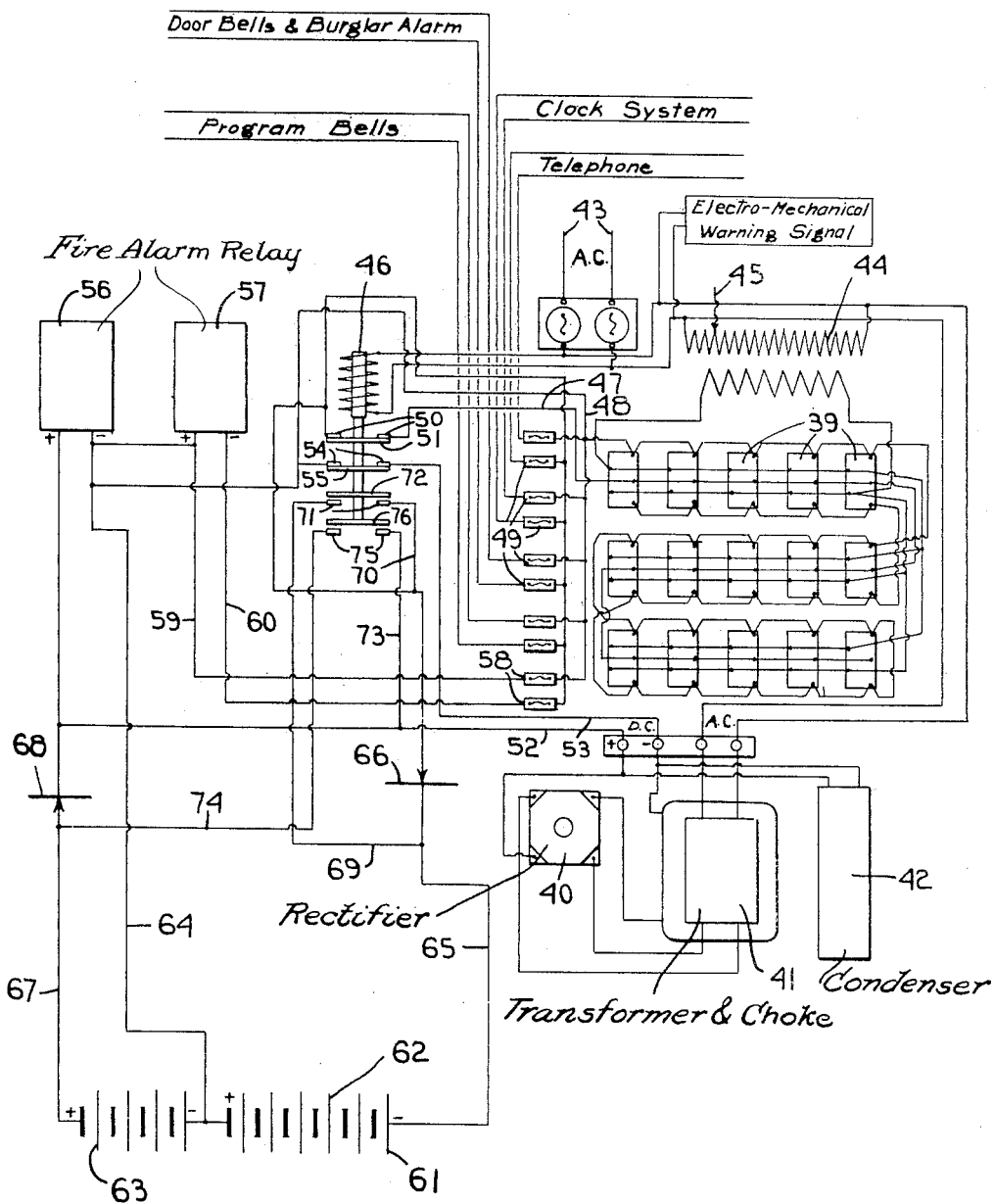

1,953,602

UNITED STATES PATENT OFFICE 1,953,602

APPARATUS FOR MAINTAINING AN UNFAILING AND UNINTERRUPTED SUPPLY OF ELECTRICAL ENERGY

John J. Hanley, Jamaica Plain, Mass.

Application November 7, 1932, Serial No. 641,582

11 Claims. (Cl. 171—97)

This invention relates to apparatus for supplying electrical energy to electrically operated devices and has for its general object to produce a flow of electrical energy in a circuit which includes the electrically operated devices and to maintain the flow of electrical energy uninterruptedly and with unfailing certainty.

A specific object of the invention is to provide apparatus for automatically changing from a condition where a given source of electrical energy is supplying an external circuit to a condition where another source of electrical energy supplies the external circuit with no interruption of electron flow in the external circuit.

A further specific object of the invention is to provide an apparatus for supplying electrical energy to an external circuit which normally derives its power from a commercial power circuit and in which upon interruption of the power in the commercial circuit a secondary source of electrical energy automatically acts as and when the commercial circuit is interrupted to supply energy to the external circuit with no interruption of electron flow in the external circuit.

A further specific object of the invention is to provide an apparatus having automatic switching means to close a circuit leading from a normally inactive source of electrical energy to an external circuit as and when an active source of electrical energy normally feeding energy to the external circuit is interrupted, the apparatus providing also means for supplying energy to the external circuit during the period of time after the active source is interrupted and before the switching means closes the circuit leading to the normally inactive circuit, thereby changing from one source to the other with no interruption of electron flow in the external circuit.

A further specific object of the invention is to provide an apparatus for maintaining uninterruptedly and with unfailing certainty the necessary electrical energy required to supply alarms and signal systems upon which depend the safety of life and property, such as fire alarm systems and railway signal systems.

The basic form of the invention comprises a main circuit containing electrically operated devices which are supplied with power from a primary source of electrical energy connected in the main circuit. During the normal operation of the apparatus, the primary source of electrical energy supplies power to the electrically operated devices. A reserve source of electrical energy is connected parallel with the primary source. The connections from the reserve source and the source itself constitute a shunt connection across the primary source of electrical energy. A unidirectional current valve is inserted in the shunt circuit acting to control the flow of current from the reserve source. The unidirectional current valve acts to permit substantially free electron flow in the circuit in one direction only and prevents substantially all electron flow in the opposite direction. The current valve is so situated in the shunt circuit that substantially no current from the primary source can flow through the valve into and through the shunt circuit. The electrical pressure of the primary source is preferably maintained at such value relatively to the reserve source that no leakage of current through the current valve in either direction is permitted. If the electrical pressures were not properly adjusted, a slight amount of current might flow from the reserve source inasmuch as the resistance of the current valve may not be infinite in a direction opposite to that of its free flow. The electrical pressure of the primary source is opposed at the current valve by the electrical pressure of the reserve source so that the portion of the circuit between these sources with the current valve constitutes an electrical pressure controlling means having a common conductor for the two sources.

To provide the proper unidirectional current carrying characteristics of the current valve, it is found preferable to use a device composed of a plurality of metallic plates, one side of which has formed thereon an oxide of the metal. The metallic plates may be formed and arranged in intimate contact with each other in a manner similar to that set forth in the United States patent to Grondahl, No. 1,640,335. Copper plates having a cuprous oxide formed on one side thereof have been found most suitable for the present use. Inasmuch as the unidirectional current valve as employed in the present invention functions to conduct current flowing in one direction quite readily and to prevent flow of current in the opposite direction, it may aptly be termed a unidirectional conductor, which term as used hereinafter conveys the same meaning as the other terms used to designate the unidirectional current valve. A more detailed description of the current valve and the cooperating elements of the apparatus will be presented hereinafter.

In the drawings:

Fig. 1 is a diagrammatic view of a simple form of apparatus embodying the invention.

Fig. 2 is a diagrammatic view illustrating the use of the apparatus in a signalling system.

Fig. 3 is a diagrammatic view of the apparatus embodied in a supervised fire alarm system also having suitable outlets to which apparatus other than the fire alarm system may be connected.

Fig. 4 is a front elevation and Fig. 5 is a cross sectional view of a form of unidirectional current valve in which the number of copper plates connected in the circuit may readily be adjusted manually.

Fig. 6 is a front view of a cuprous oxide full-wave rectifying device.

Fig. 7 is a side elevation of the device illustrated in Fig. 6.

Fig. 8 is another form of a unidirectional current valve having sufficient capacity to be used in various types of apparatus and in which permanent adjustments may be made to accommodate it to a particular apparatus.

Fig. 9 is a preferred form of unidirectional current valve having fixed terminals to be connected in the circuit in such manner that the total capacity of the unit is always functioning.

A simple form of apparatus embodying the invention is illustrated in Fig. 1 in which a normally active source of electrical energy 1 delivers direct current to a pair of conductors 2 and 3 which in turn are connected to the conductors 4 and 5 leading to any form of electrically operated devices, as indicated on the drawings. The source of supply 1 may be of any character and is shown herein as a full wave rectifying device receiving its primary supply of energy from a commercial power line indicated at 6. The source of electrical energy 1, the leads 2, 3, 4, 5 and the electrically operated devices may be considered as the main circuit. An additional circuit 7 containing a secondary source of electrical energy 8 is connected parallel with the conductors 2 and 3 of the main circuit leading to the source of current 1. The circuit 7 may be called a shunt circuit since it constitutes a shunt connection around the source of current 1. Situated in the shunt circuit 7 is a unidirectional current valve 9. The current valve 9 is so connected in the circuit 7 that if the circuit were unassociated with the rest of the apparatus, current from the source 8 would be permitted to flow through the valve in the direction of the arrows, while current flow in the opposite direction would be substantially prevented. However, the flow of current through the current valve 9 is prevented by reason of its connection to the main circuit. The electrical pressure in the main circuit normally acts oppositely to and prevents flow of current through the valve.

Under normal conditions, therefore, no current flows in the circuit 7 and the electrically operated devices function solely by the power supplied from the source 1. If, however, the source of current 1 falls due to the interruption of current in the commercial circuit or an open circuit condition develops anywhere in the system or the voltage of the current in the system drops below its normal value, the electrical pressure acting in opposition to the flow of current in the circuit 7 drops to zero thereby establishing a free electron flow through the current valve 9, thereby permitting the source 8 to deliver its energy to the main circuit and continue to operate the electrically operated devices. It is obvious that this change from one source of supply to the other has taken place without the use of mechanical switching devices and has accomplished the change from one source to the other with no interruption of current flowing to the electrically operated devices.

As above set forth, the current valve 9 is constructed under the principles of the Grondahl patent. The copper plate elements 10 are desirably circular in shape and placed in intimate contact one with the other with the face having the oxide thereon of one plate placed in contact with the smooth face of the adjacent plate. A disk 11 of lead or other soft metal is desirably placed between each of the copper plates and the whole assembly drawn together tightly by means of a bolt 12.

The last copper plate at one end of the assembly plates is desirably connected to a contact plate 13 which is connected to one of the terminals of the unit. If it is desirable to vary the number of plates connected in the circuit, means for readily making such adjustment are provided. Between every third copper plate or at any desired interval are situated thin contacting plates 14 to which are soldered or otherwise connected wires 15 which are in turn connected to a plurality of contacts 16 on the outer face of a front plate 17 of a casing 18 within which the unit is housed. The front plate 17 is of insulating material and is provided with a central aperture 19 within which is pivoted a contact arm 20 which may be manually rotated by means of a knob 21 to cause the arm 20 to engage the desired contacts 16. Irrespective, therefore, of the number and arrangement of the cuprous oxide plates as required by the desired capacity, the switching means acts to vary the resistance by increasing or decreasing the number of plates in series.

After the apparatus has been assembled and the electrical supply sources have been connected, it is desirable to ascertain whether current may be flowing in the circuit 7. This is undesirable since the battery 8 may be losing its charge or may be reciving energy from the source 1 which may tend to overcharge the battery 8. A current meter is therefore inserted in the circuit 7 to record any flow of current. If such current flow is present, as indicated by the meter, the arm on the current valve is rotated to select the proper number of copper plates to balance the two circuits and thereby to prevent this undesirable current flow. It will be observed that the current valve and its internal connections are similar to a rectifying device arranged for halfwave rectification of an alternating current.

The rigid requirements in connection with installing fire alarm systems require that a very reliable source of power be used to supply current for the alarms. The present invention is therefore particularly adapted for use in connection with fire alarm systems and other systems where the safety of property and human life depend upon the unfailing operation of the system. As a result of these rigid requirements, practically all of the fire alarm systems in present use rely upon storage batteries or other sources of power not directly connected with a commercial power line for the reason that the power line is not reliable and is subject to interruption which may cause unnecessary loss of property and life. By means of applicant's invention, it is possible to use a commercial source of current for normally maintaining the required energy in the system and at the same time insuring an uninterrupted and unfailing supply of electrical energy to the system.

Fig. 2 illustrates a simple application of applicant's invention to a fire alarm system in which a fire alarm box 22 is connected to a rectified source of alternating current supplied by a commercial circuit 23. The rectified current reaches the fire alarm system through the conductors 24 and 25. A circuit is completed between the fire alarm box 22 and a relay 26 through the usual connection 27. Alternating current from the commercial circuit 23 is connected to a transformer and choke 28 from where it is fed to a cuprous oxide full wave rectifier 29. The rectified alternating current then emerges from the rectifier and is connected to the conductors 24 and 25. In order to insure a smoother flow of rectified current, the rectifying system is preferably provided with a condenser 30 which is shunted across the conductors 24 and 25.

The reserve source of electrical energy is provided by a battery 31. The source of electrical energy 31 is connected to the conductors 24 and 25 by means of the wires 32 and 33. The battery 31 and the wires 32 and 33 constitute a shunt circuit around the rectifying system which normally supplies current to the fire alarm system. A unidirectional current valve 34 is inserted in the shunting portion of the shunt circuit in such manner that if the shunt circuit were an independent circuit, current would flow through the current valve in a direction indicated by the arrows. The electrical pressure generated by the rectifying system, however, acting through the wire 33 prevents such flow of current through the valve. The high resistance of the current valve to flow of current in the opposite direction to that of its free flow acts to prevent the rectified current in the conductors 24 and 25 from flowing through the current valve and into the battery 31. The current valve may, of course, be connected at any point in the shunting portion of the shunt circuit providing it is connected to permit flow of current in the proper direction.

The current valve 34 may be designed to carry indefinitely the total amount of current required by the signalling system in the event that the rectified source fails. However, one of the characteristics of the current valve is its ability to permit a relatively large flow of current for a short period of time such as a second, or a few seconds, and after the lapse of this time, its capacity is considerably lowered. Advantage of this characteristic is made use of in the system to avoid the necessity of constructing a current valve large enough to carry the total amount of current required in the system indefinitely. A standard electro-mechanical gravity-operated relay switch 35 is inserted in either one of the conductors 24 and 25. As herein shown, the switch is inserted in the conductor 25. Normally the solenoid 36 of the switch 35 maintains the armature 37 of the switch in its raised position. In such position the conductor 25 has a continuous copper path to supply the signalling system. When, however, the commercial circuit 23 is interrupted or fails or its voltage drops below a predetermined value, the gravity-actuated armature 37 of the switch 35 drops down, causing the conductor 25 to become open-circuited, and at the same time the switch acts to close a normally open short-circuiting circuit 38, thereby providing a low resistance path for the passage of current from the battery 31 into the signalling system independently of the current valve 34. The valve 34 is shown in Fig. 2 diagrammatically as being of the variable type shown in Figs. 4 and 5.

If it were not for the current valve 34, the current supplied to the signalling system would be entirely interrupted for the fraction of a second while the armature 37 of the switch 35 is moving from its upper position to its lower position. The current valve 34 has, however, functioned during this fraction of a second to pass the necessary amount of current from the battery 31 to the system. The change from rectified current supplied by the circuit 23 to the battery 31 has therefore been made with no interruption whatever of the current supplied to the system. It is obvious that other sources of electrical energy may be employed in place of the rectifying unit and the battery 31 as above described.

Fig. 3 illustrates diagrammatically the wiring system of a standard fire alarm having a main circuit and a supervisory circuit. The main circuit is supplied with rectified alternating current from a plurality of full wave rectifying units 39, while the supervisory circuit is supplied with current from an independent rectifying system employing a full wave rectifying unit 40 in conjunction with a transformer and choke unit 41 and a condenser 42. The latter rectifying system is similar to the one described in connection with Fig. 2 in the drawings.

The rectifying units 39 are supplied with alternating current from a commercial circuit 43 which is connected to a transformer 44 which steps down the voltage of the commercial line to the value required to be impressed upon the rectifying units. For the particular system herein disclosed, the secondary voltage of the transformer may be approximately thirty-six volts which becomes approximately eighteen volts after being rectified. When the rectifying units are first installed, it is found desirable slightly to increase the impressed voltage therein for a certain specified time determined by the maker of the rectifying units. For this purpose an aging tap 45 is provided on the transformer and to which a connection is made temporarily. When a connection is made to the aging tap, a few turns of the primary of the transformer are eliminated, thereby increasing the voltage ratio to produce a greater voltage in the secondary.

By employing a plurality of rectifying units to supply the necessary current to the system, it is obvious that innumerable variations in the connections to these units may be made to provide different voltages and different current capacities at the output terminal of the system. As shown herein, the rectifying units 39 are connected in parallel to provide a given voltage of substantially eighteen volts with the current carrying capacity of all of the units. An electro-mechanical gravity-operated switch 46 maintains a closed circuit through the conductors 47 and 48 leading from the rectifiers 39 to the terminal and fuse blocks 49 through the contacts 50 and the switch blade 51. The switch 46 normally maintains a closed circuit from the rectifying system containing the unit 40 through the wires 52 and 53, the contacts 54 and the switch blade 55 to the supervisory relay 56 of the fire alarm system. The main fire alarm relay 57 is connected to the rectifiers 39 through the terminals and fuse blocks 58 and the wires 59 and 60. The fire alarm systems are not completely illustrated, but inasmuch as any standard type of system may be employed, it is deemed unnecessary to illustrate more than one of the relays in the main system and one in the supervisory system, each of which are illustrated diagrammatically only.

A reserve source of electrical energy may be supplied by any type of generating apparatus. As shown herein, a battery 61 is employed for this purpose and desirably is in two sections, section 62 and 63. The section 62 is shunted across the conductors 47 and 48 of the rectifiers 39 by means of the wires 64 and 65. The wire 65 has connected therein the unidirectional current valve 66 arranged to permit flow of current from the battery 62 in the direction indicated by the arrows and prevent flow of current in the opposite direction. The current valve 66 may be of the fixed type or may be variable, as shown in Figs. 4 and 5 of the drawings and indicated diagrammatically by the diagonal arrow in Fig. 3. In each case where a current valve is described herein, it may be of the fixed or variable type.

The section 63 of the battery 62 is shunted across the wires 52 and 53 leading from the rectifying unit 40. This shunt circuit is composed of the wire 67 and the wire 64, the latter wire acting as a common conductor for both the battery sections. A unidirectional current valve 68 is inserted in the wire 67 and normally acts to prevent flow of current from the rectifying unit 40 to the section 63 of the battery and permits free flow of current from section 63 into the supervisory fire alarm system.

The current valve 66 is provided with a pair of short-circuiting wires 69 and 70 leading to the contacts 71 of the switch 46. The contacts 71 are closed by the blade 72 when the alternating current line 43 becomes interrupted. The current valve 68 is provided with short-circuiting wires leading to contacts 75 which are closed by the blade 76 when the current in the line 43 is interrupted.

The system disclosed in Fig. 3 functions in a similar manner to that described in connection with Fig. 2. Normally the rectifying units 39 supply energy to the main fire alarm system and the other systems indicated by legends on the drawings. The rectifying unit 40 supplies energy to the supervisory portion of the fire alarm system. When the alternating current from the line 43 becomes interrupted or its voltage drops, the current from the battery 62 is permitted to flow through the current valves 66 and 68 to supply all of the electrically operated devices connected to the system. The switch 46 acts at this time to open the conductors 47 and 48 and also the conductor 53 leading from the rectifier 40. The switch 46 acts also at this time to short-circuit the current valves 66 and 68. The change from one source of energy to the other is thereby made automatically with no interruption of the necessary current required to operate the various electrically operated devices involved. Obviously any type of electrical apparatus may be operated and any type of electrical generator may be employed to supply the necessary electrical energy without departure from the principles of the invention.

The rectifying units 39 and 40 are desirably constructed according to the principles set forth in the above-mentioned patent. A desirable form of such device used as a full-wave rectifier as it is herein used to rectify alternating current normally to provide a source of direct current is shown in Figs. 6 and 7. The copper oxide plates 10 have cuprous oxide formed on one face thereof and are superposed with the cuprous oxide face of each plate arranged adjacent to the face of the adjacent plate which does not have cuprous oxide thereon and all of the plates are drawn into close contact by means of the bolt 77 which is insulated from the plates 10. If desired, plates of lead or other soft metal may be interposed between each copper plate 10 to insure a positive and even contact throughout the area of the plates. The plates are divided into four groups. Between each group and at the ends of the outer groups are situated specially constructed tap plates 78, 79, 80, 81 and 82, which extend beyond the limits of the plates 10 and are electrically connected thereto. The tap plates are desirably provided with binding posts 83 or other suitable connecting means with which to connect them to the alternating current supply line and to conduct away the direct current. The groups of plates 10 are properly arranged to rectify the alternating current when such current is connected to the plates 79 and 81, while the direct current is conducted away from the plates 78, 80, and 82. Any other suitable arrangement of the rectifier may be made to rectify both halves of the alternating current supplied thereto.

Fig. 8 of the drawings illustrates a unidirectional current valve for use in connection with different types of apparatus, sufficient capacity being provided to supply the requirements of the type of apparatus requiring the greatest amount of current ordinarily consumed. Tap plates 84 are provided at intervals along the length of the device. One end of the circuit in which the device is used is connected permanently to the binding post 85 and one end of the valve. When the required number of plates 10 for use in the particular circuit in question has been determined, a soldered or other permanent connection is made as at 86 at the particular tap plate which includes the proper number of plates 10. If additional apparatus is connected in the system or other variable condition arises, the connection made at 86 may be changed to a position such as that indicated by the dotted position 87 which connection is also made permanent.

A simple but desirable form of unidirectional current valve is shown in Fig. 9, in which one circuit connection is made to the center of the pile of plates 10, as at 88, while the other circuit connection is made at the two outer plates, as at 89. Such units are constructed for use in circuits not requiring adjustment.

The invention is adapted for use as an emergency control in connection with many types of apparatus and electrical circuits such as those employed for heating, lighting, and power, as well as the signal systems, electric clock systems, telephone circuits and the like. The apparatus is well adapted to maintain uninterrupted current flow in theatre lighting systems or in the lighting systems of operating rooms in hospitals and other instances where it is extremely important to maintain the power supply uninterrupted.

In power and lighting systems a battery would be used to maintain the current in the external circuit as in the case of signalling systems. In the power circuits, however, the current drain on the battery would be relatively much greater than in signalling systems. It is possible to construct a battery and install it which would have sufficient capacity to carry the power load for a considerable period during which the commercial circuit would be out of service. A more practical procedure, however, is to have available at all times another large source of power such as another independent commercial circuit. In this case, instead of allowing the battery to carry the load during the period the original commercial circuit is out of service, the reserve commercial circuit may be switched into service, either manually or automatically. The battery with its cooperating unidirectional current valve would only be in service during the period of time necessary for the change from one commercial circuit to the other. Obviously any number of independent commercial circuits or other sources of power may be made available in case two or more of these sources should fail. The circuit 90, Fig. 1, or 92 in Fig. 2 illustrates a reserve commercial circuit having an automatic switch 91 in Fig. 1 or 93 in Fig. 2 therein by means of which it may be connected to the electrically operated devices.

The advantages of such a system are apparent. By its use an unfailing and uninterrupted flow is assured at a minimum of expense. The necessary apparatus required is extremely low in cost compared to the efficient service it renders. The battery installation need be relatively inexpensive for the reasons above given. A battery of the Edison nickel iron type is ideal for such installations since this type of battery requires very little attention and has an extremely long life. A lead battery will also be quite suitable since its life would be relatively long because of the fact that the service it would render would be very light and intermittent. The batteries in every installation may be kept in fully charged condition by means of automatic charge apparatus.

It is important in all systems of this type that a warning be given to indicate failure of the commercial circuit. This signal is desirably inserted in the circuit between the protecting fuses and the rectifying transformer and is desirably of the electro-mechanical type of signal. A no-voltage release coil acts when there is a current failure to trip the mechanical signalling device to give the desired audible signal. The signal functions when there is a failure due to a wire defect within the building housing the apparatus as well as at all other points in the circuit. Such a signal so situated would also supervise the fuses which protect the system. Such a warning signal is indicated at 92 in Fig. 3 of the drawings.

Having thus described the invention, what is claimed as new, and desired to be secured by Letters Patent, is:

1. An apparatus for maintaining an unfailing and uninterrupted supply of electrical energy to an external circuit comprising two sources of supply connected to said external circuit, a unidirectional conductor acting to prevent flow of current to said external circuit from one of said sources when the other source is active, and acting temporarily as and when the current from the active source is interrupted to permit the required current flow from the initially inactive source without interruption of current in said external circuit and means operable thereafter for shunting the current flowing from the initially inactive source to said external circuit around said unidirectional conductor.

2. An apparatus for maintaining an unfailing and uninterrupted supply of electrical energy to an external circuit comprising two sources of supply connected to said external circuit, a unidirectional conductor acting to prevent flow of current to said external circuit from one of said sources when the other source is active, and acting temporarily as and when the current from said active source is interrupted to permit the required current flow from the initially inactive source without interruption of current in the external circuit, and means acting automatically thereafter for shunting the current flowing from the initially inactive source to said external circuit around said unidirectional conductor.

3. An apparatus for maintaining an unfailing and uninterrupted supply of electrical energy to an external circuit comprising two sources of supply connected to said external circuit, a unidirectional conductor acting to prevent flow of current to said external circuit from one of said sources when the other source is active, and acting temporarily as and when the current from the active source is interrupted to permit the required current flow from the initially inactive source without interruption of current in said external circuit and means operable thereafter for shunting the current flowing from the initially inactive source to said external circuit around said unidirectional conductor and means operable simultaneously with said shunting means for opening the circuit from the initially active source.

4. An apparatus for maintaining an uninterrupted current of predetermined voltage in an external circuit comprising two sources of supply connected to said external circuit for furnishing such current, a unidirectional conductor acting to prevent flow of current to said external circuit from one of said sources when the other source is supplying current of the said voltage and acting temporarily as and when the current from the active source is interrupted or its voltage is reduced below the predetermined voltage to permit current to flow from the initially inactive source to maintain the required voltage without interruption of or reduction in the voltage of the current in the external circuit, and means operable thereafter for shunting the current flowing from the initially inactive source to said external circuit around the unidirectional conductor.

5. An apparatus for maintaining an uninterrupted current of predetermined voltage in an external circuit comprising two sources of supply connected to said external circuit for furnishing such current, a unidirectional conductor acting to prevent flow of current to said external circuit from one of said sources when the other source is supplying current of the said voltage and acting temporarily as and when the current from the active source is interrupted or its voltage is reduced below the predetermined voltage to permit current to flow from the initially inactive source to maintain the required voltage without interruption of the current in the external circuit, and means acting automatically thereafter to shunt the current flowing from the initially inactive source to said external circuit around the unidirectional conductor.

6. An apparatus for maintaining an unfailing and uninterrupted supply of electrical energy to an external circuit comprising two sources of supply connected to said external circuit, a unidirectional conductor acting to prevent flow of current to said external circuit from one of said sources when said other source is active and acting temporarily as and when the current from said active source is interrupted or the voltage thereof drops to a predetermined value to secure the required current flow from the initially inactive source without interruption in said external circuit, a shunt circuit around said unidirectional conductor and an automatic electromagnetic switch having a potential coil connected to said active source acting normally to close the circuit from said active source to said external circuit and acting after interruption or a predetermined voltage drop in said active source to open the circuit from said active source and to close said shunt circuit.

7. An apparatus for maintaining an unfailing and uninterrupted supply of electrical energy to an external circuit, two sources of electrical energy of substantially the same voltage connected to said external circuit, a variable cuprous oxide unidirectional conductor said unidirectional conductor acting to prevent flow of current to said external circuit from one of said sources when the other source is active and acting temporarily as and when the current from said active source is interrupted or the voltage thereof drops to a predetermined value to secure the required current flow from the initially inactive source without interruption of current in said external circuit, and switching means operable to vary the number of active plates in said unidirectional conductor thereby normally to prevent flow of current therethrough such variation in the number of plates acting to compensate for a difference in voltage existing between the two sources.

8. An apparatus for maintaining an unfailing and uninterrupted supply of electrical energy to an external circuit, two sources of electrical energy, a variable cuprous oxide unidirectional conductor acting to prevent flow of current to said external circuit from one of said sources when the other source is active said unidirectional conductor normally acting to permit a relatively small amount of current to flow from the active source to the other source and acting as and when the current from said active source is interrupted or the voltage thereof drops to a predetermined value to secure the required current flow from the initially inactive source without interruption of current in said external circuit, and switching means operable to vary the number of active plates in said unidirectional conductor thereby to regulate the amount of current normally flowing from the active source to the inactive source.

9. An apparatus for maintaining an unfailing and uninterrupted supply of electrical energy comprising an external circuit, two or more independent sources of power supplied by commercial power lines one of which is connected to said external circuit, a battery connected to said external circuit, a unidirectional conductor in said battery circuit acting normally to prevent flow of current to said external circuit from said battery while the commercial source is active and acting temporarily as and when the current from the active commercial source is interrupted or the voltage thereof drops to secure the required current flow from the battery without interruption of current in said external circuit, means for shunting the current flowing from said battery to said external circuit around said unidirectional conductor and switching means automatically operable to change the connection from the active to another of said commercial sources of supply to said external circuit before the current capacity of said battery becomes excessively depleted.

10. An apparatus for maintaining an unfailing and uninterrupted supply of electrical energy comprising a source of alternating current supplied by a commercial power line, a multiple unit rectifier acting to rectify the current from said alternating source and capable of delivering a maximum current from all of the units thereof at the voltage of one unit or of delivering current at various voltages with a current capacity less than the current capacity of all of the units, a system connected to and supplied with current from said rectifier, a battery connected to said system, a unidirectional conductor acting normally to prevent flow of current to said system from said battery when said rectifier is active and acting temporarily as and when the current from said rectifier is interrupted or the voltage thereof drops to a predetermined value to secure the required current flow from said battery to said system without interruption of current in said system and means for shunting the current flowing from said battery to said system around said unidirectional conductor.

11. An apparatus for maintaining an unfailing and uninterrupted supply of electrical energy comprising a source of alternating current supplied by a commercial power line, a multiple unit rectifier acting to rectify the current from said alternating current source, a main system connected to and supplied with current from said rectifier, a battery connected to said main system, a system supervisory to said main system, an independent rectifier acting to supply current to said supervisory system, a battery connected to said supervisory system, a unidirectional conductor in each of said systems acting to prevent flow of current to its respective system from its respective battery when their respective rectifiers are active and acting temporarily as and when the current from either one or both of said rectifiers is interrupted or the voltage thereof drops to a predetermined value to secure the required current flow from the batteries to their respective systems without interruption of current in the systems and means for shunting the current flowing from the batteries to their respective systems around the unidirectional conductors.

JOHN J. HANLEY.